(12) United States Patent
Kim et al.

(10) Patent No.: US 12,691,726 B2
(45) Date of Patent: Jul. 28, 2026

(54) VEHICLE THERMAL MANAGEMENT SYSTEM

(71) Applicants: HYUNDAI MOTOR COMPANY, Seoul (KR); KIA CORPORATION, Seoul (KR)

(72) Inventors: Jae Woong Kim, Hwaseong-si (KR); Dae Ki Hong, Hwaseong-si (KR); Seok Jin Hong, Hwaseong-si (KR); Ki Hoon Kim, Ansan-si (KR); Jae Kwon Lee, Hwaseong-si (KR); Se Kyu Oh, Guri-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 162 days.

(21) Appl. No.: 18/819,702

(22) Filed: Aug. 29, 2024

(65) Prior Publication Data

US 2025/0289285 A1 Sep. 18, 2025

(30) Foreign Application Priority Data

Mar. 12, 2024 (KR) ........................ 10-2024-0034663

(51) Int. Cl.
*B60H 1/00* (2006.01)

(52) U.S. Cl.
CPC ..... *B60H 1/00899* (2013.01); *B60H 1/00278* (2013.01); *B60H 1/00392* (2013.01); *B60H 1/0073* (2019.05); *B60H 2001/00307* (2013.01)

(58) Field of Classification Search
CPC .............. B60H 1/0073; B60H 1/00921; B60H 1/00271; B60H 1/00278
See application file for complete search history.

(56) References Cited

U.S. PATENT DOCUMENTS

| | | | |
|---|---|---|---|
| 10,875,382 B2 | 12/2020 | Ben Ahmed | |
| 2022/0080808 A1 | 3/2022 | Cao | |
| 2022/0281290 A1* | 9/2022 | Hirabayashi | ......... B60H 1/3202 |

FOREIGN PATENT DOCUMENTS

| | | | | |
|---|---|---|---|---|
| CN | 115071367 A | * | 9/2022 | ......... B60H 1/00392 |
| JP | 2023011133 A | | 1/2023 | |
| JP | 2023075845 A | | 5/2023 | |
| KR | 20220033592 A | | 3/2022 | |
| KR | 20220050560 A | | 4/2022 | |

* cited by examiner

*Primary Examiner* — Eric S Ruppert
(74) *Attorney, Agent, or Firm* — Lempia Summerfield Katz LLC

(57) ABSTRACT

A vehicle thermal management system includes a fluid transfer device including an electric power consumption unit, and a control unit for controlling indoor heating through the fluid transfer device on the basis of an optimal control value for the indoor heating.

20 Claims, 5 Drawing Sheets

FIG. 3

VEHICLE THERMAL MANAGEMENT SYSTEM

CROSS REFERENCE TO RELATED APPLICATION

This application claims priority to Korean Patent Application No. 10-2024-0034663, filed Mar. 12, 2024, the entire contents of which are incorporated herein by reference.

BACKGROUND

Field of the Disclosure

The present disclosure relates to a vehicle thermal management system for performing thermal management of a vehicle.

Description of the Related Art

With the recent increase in interest in the environment, the number of eco-friendly vehicles equipped with an electric motor as a power source are increasing. Eco-friendly vehicles are also referred to as electrified vehicles, and representative examples include hybrid electric vehicles (HEVs) and electric vehicles (EVs). Such electric vehicles not only consume electric energy for driving, but also consume electric energy for indoor air conditioning, so the efficiency of indoor air conditioning has a significant impact on electric vehicle power efficiency and overall energy efficiency including the electric vehicle power efficiency.

In particular, the electric vehicles that do not have an engine drive only through the driving force of a motor, and waste heat of the engine cannot be used for indoor air conditioning, and thus high energy efficiency is desired.

In addition, an electric vehicle has parts such as a high-voltage battery, a motor, and the like for driving, and since operational performance of these parts is affected by temperature, it has become increasingly necessary to consider not only interior air conditioning but also requirements of the parts in terms of thermal management.

Therefore, in order to optimally perform the thermal management of an electric vehicle and improve the overall energy efficiency of the electric vehicle, it is required to take into account constraints on vehicle parts, goals of indoor air conditioning, and the like extensively.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a vehicle thermal management system capable of improving efficiency of overall vehicle thermal management through hierarchical thermal management by performing the vehicle thermal management in consideration of thermal management results of vehicle parts.

The problems of the present disclosure are not limited to the above-mentioned problems, and other problems not described above will be clearly understood by those skilled in the art from the description of the claims.

According to embodiments of the present disclosure for solving the above problem, there is provided a vehicle thermal management system. The vehicle thermal management system includes: a fluid transfer device provided with a heat pump function for exchanging heat with at least one or more vehicle parts to selectively recover waste heat of the vehicle parts and discharging air into a vehicle interior to perform indoor heating. The fluid transfer device includes an electric power consumption unit for consuming electric power in order to perform the heat pump function. The vehicle thermal management system further includes a control unit configured to control the indoor heating through the fluid transfer device based on an optimal control value for heating. The optimal control value is derived by using a control model for a predicted state value according to a current state value. In particular, the optimal control value for the indoor heating may be a control value for satisfying a constraint of a waste heat recovery amount according to thermal management results of the vehicle parts and generating a target discharge air temperature for performing, by the fluid transfer device, indoor heating while consuming minimal electric power through the electric power consumption unit.

In one embodiment, the electric power consumption unit may include: coolant pumps configured to flow a coolant for cooling the vehicle parts; and a compressor configured to compress and discharge a refrigerant that recovers the waste heat from the vehicle parts through the coolant. The optimal control value for the indoor heating may include: a mass flow rate of the coolant passing through the coolant pumps; and a mass flow rate of the refrigerant passing through the compressor.

In one embodiment, the electric power consumption unit may further include a heater configured to heat the air being discharged into the vehicle interior, and the optimal control value for the indoor heating may further include electric power consumption of the heater.

In one embodiment, the fluid transfer device may selectively absorb heat from air outside a vehicle according to the thermal management results of the vehicle parts, and the electric power consumption unit may further include a fan configured to flow the air outside the vehicle towards the vehicle interior. The optimal control value may further include a mass flow rate of the outside air flowing in.

In one embodiment, the current state value and the predicted state value may include: a temperature of the air being discharged into the vehicle interior; and a temperature of a refrigerant for recovering the waste heat from the vehicle parts.

In one embodiment, the constraint on the waste heat recovery amount may be determined based on i) a recoverable amount of the fluid transfer device, ii) the recoverable amount reflecting a heat dissipation amount of the vehicle parts and iii) heat transfer efficiency in a heat exchange process.

In one embodiment, the control unit may derive the optimal control value for the indoor heating on the basis of a target value for performing, by the fluid transfer device, the indoor heating while consuming the minimal electric power through the electric power consumption unit. The target value may be determined based on electric power consumption and a control model for an output value according to the state value and control value.

In one embodiment, the control unit may determine a control value for minimizing a cost function for a preset prediction range as the optimal control value, and the cost function may reflect a state cost having a weight on the state value and a control input cost having a weight on the control value.

In one embodiment, the control unit may control vehicle part thermal management through the fluid transfer device based on an optimal control value for the vehicle part thermal management, which is derived by using the control model for the predicted state value according to the current state value. The optimal control value for the vehicle part thermal management may be a control value for maximizing a heat dissipation amount of the vehicle parts by exchanging heat between the fluid transfer device and the vehicle parts in comparison with the electric power consumption of the electric power consumption unit while satisfying a constraint for securing the operational performance of the vehicle parts.

In one embodiment, the control unit may derive the optimal control value for the vehicle part thermal management based on a target value for maximizing the heat dissipation amount of the vehicle parts in comparison with the electric power consumption of the electric power consumption unit. The target value may be determined based on the electric power consumption, the heat dissipation amount, and a control model for an output value, according to the state value and the control value.

In one embodiment, the control unit may determine a control value for minimizing a cost function for a preset prediction range as the optimal control value for the vehicle part thermal management, and the cost function may reflect a state cost having a weight on the state value and a control input cost having a weight on the control value.

In one embodiment, the optimal control value for the vehicle part thermal management may include a vehicle part inlet-side temperature and a mass flow rate of a coolant circulating within the fluid transfer device and exchanging the heat with the vehicle parts.

In one embodiment, the vehicle parts may include a battery provided in the vehicle to store the electric power, and the current state value and the predicted state value may include a cell temperature of the battery and a battery outlet-side temperature of a coolant circulating within the fluid transfer device.

In one embodiment, the constraint for securing the operational performance of the vehicle parts may include a condition for battery operational performance of which the satisfaction is determined based on the cell temperature of the battery.

In one embodiment, the vehicle parts may include a drive system including a motor and an inverter, and the current state value and predicted state value may include: i) a drive system outlet-side temperature of a coolant circulating within the fluid transfer device, and ii) at least one of a motor oil temperature, a motor coil temperature, or a temperature of an element driving the inverter.

In one embodiment, the constraint for securing the operational performance of the vehicle parts may include at least one of: i) a first condition, which is determined based on the motor oil temperature, for the drive system operational performance; ii) a second condition, which is determined based on the motor coil temperature, for the drive system operational performance; or iii) a third condition, which is determined based on the temperature of the element driving the inverter, for the drive system operational performance.

In one embodiment, the vehicle parts may include a controller provided in the vehicle to perform control for performing a specific function. The current state value and predicted state value may include a temperature of the controller and a controller outlet-side temperature of a coolant circulating within the fluid transfer device.

In one embodiment, the constraint for securing the operational performance of the vehicle parts may include a condition for controller operational performance of which the satisfaction is determined on the basis of the temperature of the controller.

In one embodiment, the control unit may control vehicle part thermal management through the fluid transfer device on the basis of preset control rules.

According to embodiments of the present disclosure for solving the above problem, a vehicle thermal management system includes: a fluid transfer device provided with a heat pump function for exchanging heat with at least one or more vehicle parts to selectively recover waste heat of the vehicle parts and discharging air into a vehicle interior to perform indoor heating. The fluid transfer device includes an electric power consumption unit for consuming electric power in order to perform the heat pump function. The vehicle thermal management system further includes: a control unit configured to control the indoor heating through the fluid transfer device based on an optimal control value for heating derived by using a control model for a predicted state value according to a current state value, and further configured to control the vehicle thermal management through the fluid transfer device based on an optimal control value for vehicle part thermal management, which is derived by using the control model for the predicted state value according to the current state value. In particular, when a control value for controlling a certain component included in the fluid transfer device is included in both the optimal control value for the indoor heating and the optimal control value for the vehicle part thermal management, the control unit may control the corresponding component of the fluid transfer device based on a maximum or minimum value of the optimal control value for the indoor heating and the optimal control value for the vehicle parts.

According to various embodiments of the present disclosure as described above, indoor heating is controlled in consideration of a constraint on a waste heat recovery amount according to the thermal management results of vehicle parts, so that energy may be consumed efficiently and the goals of the indoor heating may be achieved, whereby electric vehicle power efficiency and a driving distance compared to a charge amount may be increased.

The effects of the present disclosure are not limited to the above-mentioned effects, and other effects that are not mentioned herein will be clearly understood by those skilled in the art from the following description.

BRIEF DESCRIPTION OF THE DRAWINGS

FIG. 3 is a diagram illustrating an optimal control process of a control unit according to an embodiment of the present disclosure.

Figure 1:
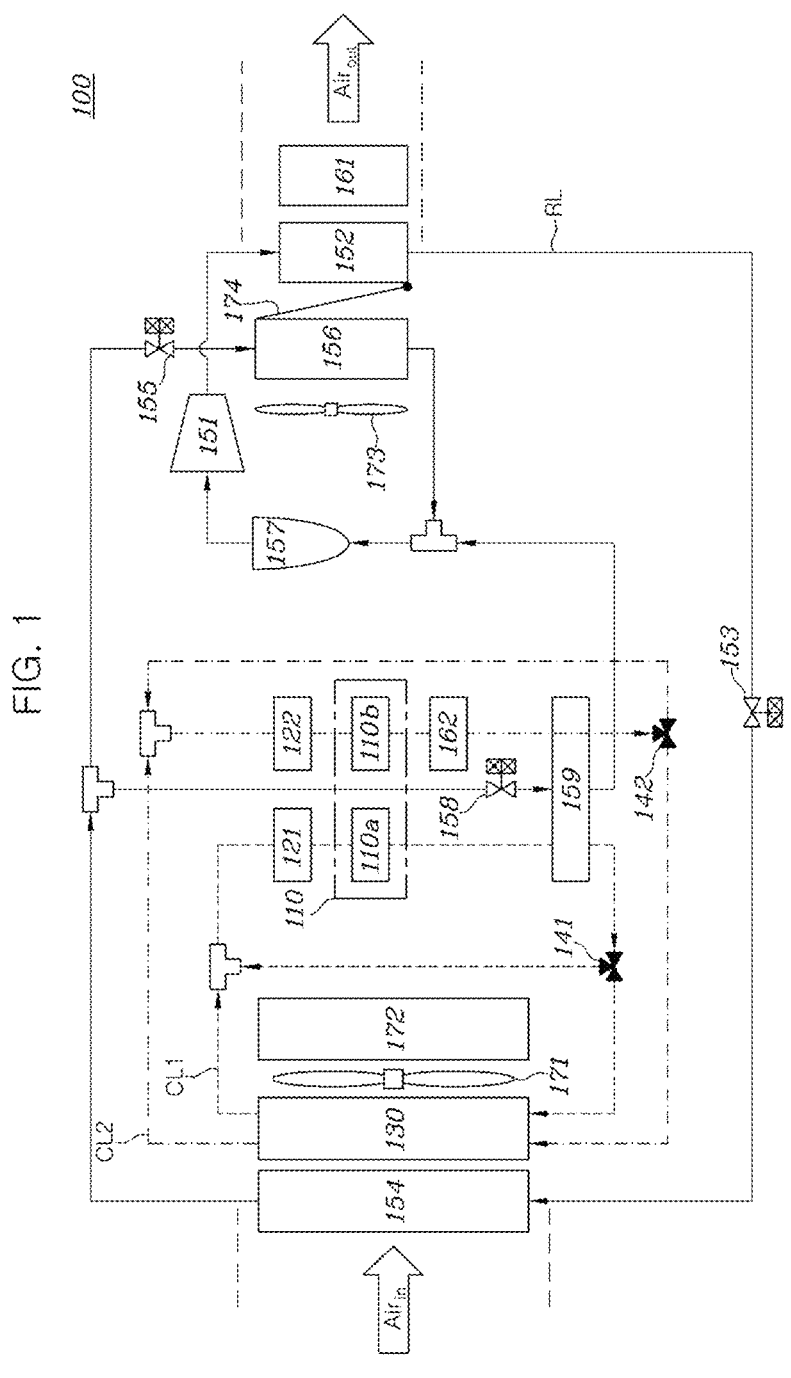
FIG. 1 is a diagram illustrating a fluid transfer device of a thermal management system applicable to an exemplary embodiment of the present disclosure.

The drawings described herein are for illustration purposes only and are not intended to limit the scope of the present disclosure in any way.

DETAILED DESCRIPTION

Specific structural and functional descriptions of the embodiments of the present disclosure disclosed herein are only for illustrative purposes of the embodiments of the present disclosure, and the present disclosure may be embodied in many different forms. Therefore, the embodiments of the present disclosure should not be construed as limiting the present disclosure.

Since the embodiments of the present disclosure may be variously modified in many different forms, specific embodiments illustrated in the drawings and the specification are not intended to limit the concept of the present disclosure to the disclosed specific embodiments. On the contrary, the present disclosure is to be understood to include all various alternatives, equivalents, and substitutes that may be included within the spirit and scope of the present disclosure.

Unless otherwise defined, all terms including technical and scientific terms used herein have the same meaning as commonly understood by those having ordinary skill in the art to which this disclosure belongs. It should be further understood that terms, such as those defined in commonly used dictionaries, should be interpreted as having a meaning that is consistent with their meaning in the context of the related art, and should not be interpreted in an idealized or overly formal sense unless expressly so defined herein.

Hereinafter, embodiments disclosed in the present specification are described in detail with reference to the accompanying drawings, but regardless of the reference numerals, the same or similar components are given the same reference numbers, and the overlapping description thereof will be omitted.

In the description of the following embodiments, the term "preset" means that a value of a parameter is predetermined when the parameter is used in step or algorithm. Depending on the embodiments, a numerical value of the parameter may be set when the process or algorithm starts execution or may be set during a section in which the process or algorithm is performed.

The words "module" and "part/unit" used as a compound noun forms for the components used in the following descriptions are given or mixed in consideration of only the ease of writing the specification, and the noun suffixes do not have distinct meanings or roles by themselves.

In describing the embodiments disclosed in the present specification, when it is determined that a detailed description of a related known technology may obscure the subject matter of the present specification, the detailed description thereof has been omitted. In addition, the accompanying drawings are only for easy understanding of the embodiments disclosed in the present specification, the technical idea disclosed in the present specification is not limited by the accompanying drawings, and it should be understood that the accompanying drawings include all changes, equivalents, or substitutes, which are included in the spirit and technical scope of the present disclosure.

It should be understood that, although the terms including ordinal numbers, such as first, second, etc. may be used herein to describe various components, these components should not be limited by these terms. These terms are only used for the purpose of distinguishing one component from another component.

When a component is described as being "connected", "coupled", or "linked" to another component, that component may be directly connected, coupled, or linked to that other component. However, it should be understood that yet another component between each of the components may be present. In contrast, when a component is described as being "directly connected", "directly coupled", or "directly linked" to another component, it should be understood that there are no intervening component present therebetween.

When a component, device, element, or the like of the present disclosure is described as having a purpose or performing an operation, function, or the like, the component, device, or element should be considered herein as being "configured to" meet that purpose or to perform that operation or function.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

As used herein, the singular forms are intended to include the plural forms as well, unless the context clearly indicates otherwise.

It should be further understood that the terms "comprise", "include", "have", etc. when used in the present specification, specify the presence of stated features, integers, steps, operations, elements, components, and/or combinations thereof, but do not preclude the presence or addition of one or more other features, integers, steps, operations, elements, components, and/or combinations thereof.

In addition, a unit or control unit included in names such as a motor control unit (MCU) and a hybrid control unit (HCU) is just a term widely used for naming of a control unit that controls vehicle-specific functions, and does not mean a generic function unit.

The control unit may include: a communication device for communicating with other controllers or sensors in order to control functions in charge; a memory for storing an operating system, logic instructions, input/output information, and the like; and one or more processors for performing determinations, calculations, decisions, etc., which are required for controlling the functions in charge.

Hereinafter, before describing the operation of a control unit for performing vehicle thermal management according to the embodiments of the present disclosure, an example of implementation of a fluid transfer device applicable to the embodiments of the present disclosure is described with reference to FIG. 1.

FIG. 1 is a view illustrating an example of a configuration of the fluid transfer device of a thermal management system applicable to the embodiments of the present disclosure.

Referring to FIG. 1, the fluid transfer device 100 applicable to the embodiments of the present disclosure may perform the vehicle thermal management such as raising the temperature or cooling for at least one or more vehicle parts 110 and operating air conditioning of a vehicle interior (i.e., a vehicle cabin).

To this end, the fluid transfer device 100 may be provided with coolant lines CL1 and CL2 for heat exchange with the vehicle parts 110, and also a refrigerant line RL for heat exchange with a coolant and surrounding air.

More specifically, a plurality of coolant lines CL1 and CL2 may be provided in the fluid transfer device 100, and the coolant lines CL1 and CL2 may be used individually for heat exchange with the vehicle parts 110 respectively in order to perform the thermal management of the vehicle parts 110 different from each other.

Here, the vehicle parts 110 may include: a drive system 110a such as a motor and an inverter; and a battery 110b. However, in the embodiments of the present disclosure, the vehicle parts 110 are not necessarily limited to the above examples and may include various parts that require heat dissipation. For example, the vehicle parts 110 may include various types of controllers (not shown), such as an autonomous driving controller, a motor controller, a vehicle controller, and a controller involved in performing the integrated thermal management according to the embodiments of the present disclosure.

FIG. 1 shows the coolant line CL1 for thermal management of the drive system 110a and the coolant line CL2 for thermal management of the battery 110b. However, in the implementation of the fluid transfer device 100, such coolant lines CL1 and CL2 may be replaced with coolant lines for thermal management of other vehicle parts 110, such as controllers, or may coexist with the coolant lines for the thermal management of other vehicle parts 110. In addition, the implementation of the fluid transfer device 100 may include various instances, including: an instance where only a single coolant line is provided for thermal management of any one of the vehicle parts 110; and an instance where a plurality of vehicle parts 110 is connected in series to one coolant line.

Pumps 121 and 122 may be provided in the respective coolant lines CL1 and CL2 for coolant circulation, and the pumps 121 and 122 may consume electric power, causing the coolant to flow toward the vehicle parts 110. Each of such pumps 121 and 122 may be implemented with, for example, an electric water pump (EWP) for circulating the coolant by driving a motor using electrical energy.

The coolant flowed towards the vehicle parts 110 through the pumps 121 and 122 may absorb heat, which is generated from the vehicle parts 110, through heat exchange while passing through the vehicle parts 110, and accordingly, cooling of the vehicle parts 110 may be achieved.

The coolant having passed through the vehicle parts 110 may flow toward a radiator 130. In a process of passing through the radiator 130, the heat absorbed from the vehicle parts 110 is dissipated to the surroundings. Thereafter, the coolant flows back into the vehicle parts 110.

In one embodiment a radiator 130 may be provided individually for each of coolant lines CL1 and CL2, and the radiators 130 respectively corresponding to the coolant lines CL1 and CL2 may be, for example, divided into a high temperature radiator and a low temperature radiator.

The refrigerant line RL may include a compressor 151, a plurality of condensers (152 and 154), a plurality of expanders (153, 155, and 158), an evaporator (156), an accumulator (157), and a heat absorber (159), and through these components the fluid transfer device 100 may perform a heat pump function.

Here, the compressor 151 may discharge a refrigerant with high temperature and high pressure by way of consuming electric power in order to implement the heat pump function through the circulation of the refrigerant, and the refrigerant passing through the compressor 151 repeatedly causes heat dissipation and heat absorption to the surroundings while passing through the components including the indoor condenser 152, the expander 153, the outdoor condenser 154, the expander 155, the evaporator 156, and the accumulator 157.

In particular, in order to recover waste heat of the vehicle parts 110 from the coolant lines CL1 and CL2, the refrigerant line RL may be configured to pass through sides of the coolant lines CL1 and CL2 and may exchange heat with the coolant lines CL1 and CL2 through the heat absorber 159 connected to the coolant lines CL1 and CL2. Meanwhile, the fluid transfer device 100 may be provided with a plurality of heat absorbers 159, unlike that shown in FIG. 1, and the plurality of heat absorbers 159 may be connected to the coolant lines CL1 and CL2, which are different from each other.

Meanwhile, in order to perform vehicle thermal management for purposes different from each other, the fluid transfer device 100 may form various heat transfer paths using the coolant lines CL1 and CL2.

For example, the coolant line CL1 for the thermal management of the drive system 110a may form heat transfer paths including: a heat transfer path for radiating heat absorbed from the drive system 110a to the outside through the radiator 130; and a heat transfer path for transferring the heat absorbed from the drive system 110a to the refrigerant line RL through the heat absorber 159, and may also form these heat transfer paths simultaneously.

The above heat transfer path is changeable depending on the flow directions of the coolant, and the flow directions of the coolant may be controlled by a valve 141 and the like, which are provided in the coolant line CL1. Furthermore, the circulation of the coolant may be suppressed by the control such as stopping the operation of the pump 121, so that the heat generated from the drive system 110a is not discharged through the radiator 130 or the heat absorber 159.

In another embodiment, the coolant line CL2 for the thermal management of the battery 110b may form a heat transfer path for discharging the heat absorbed from the battery 110b to the outside through the radiator 130 and the heat transfer path not passing through the radiator 130. In particular, in the heat transfer path not passing through the radiator 130, the heat generated from the battery 110b may be transferred to the refrigerant line RL through the heat absorber 159 by the circulation of the refrigerant in the refrigerant line RL, thereby cooling the battery 110b, or instead of transferring the heat to the refrigerant line RL, the heat of the coolant heated up through a heater 162 for heating coolant may be transferred to the battery 110b, thereby raising the temperature of the battery 110b. The heat transfer path as described above is changeable depending on the flow directions of the coolant, and the flow directions of the coolant may be controlled by a valve 142 and the like, which are provided in the coolant line C"2.

Through the heat transfer path for transferring the heat absorbed from the vehicle parts 110 to the refrigerant line RL through the heat absorber 159 among the heat transfer paths as described above, the fluid transfer device 100 may recover and recycle the heat generated from the vehicle parts 110, i.e., the waste heat, for indoor thermal management and the like, whereby energy efficiency of the vehicle thermal management may be improved.

Meanwhile, the fluid transfer device 100 may also exchange heat with the outside air, and the heat absorbed through the heat exchange from the outside air may be used for the thermal management. More specifically, the heat exchange with the outside air may also be performed indirectly through the radiator 130, or may be performed through an external evaporator (not shown) for absorbing heat from the outside air.

In performing such thermal management, the fluid transfer device 100 may control an air flow from outdoors to indoors, and may be provided with a blowing device, an opening/closing device, and the like in order to control the air flow.

The blowing device may include, for example, a cooling fan 171 for controlling inflow of the outdoor air and a blower 173 for controlling discharge of air into a vehicle interior. The opening/closing device may include, for example, an air flap 172 for controlling the inflow of the outdoor air and a temp door 174 for controlling the discharge of the air into the vehicle interior. As such, the blowing device and the opening/closing device may consume electric power in order to perform operations thereof.

In addition, the fluid transfer device 100 may also include an electric heating device for raising temperature of air or a coolant. The electric heating device may include a heater 161 for heating air being discharged into a vehicle interior. In this case, the heater 161 may be implemented with, for example, a positive temperature coefficient"(PTC' heater. In addition, as described above, the electric heating device may include a heater 162 for heating a coolant in order to increase temperature of the battery 110b.

According to the structure of the fluid transfer device 100 as described above, the vehicle thermal management may be performed in various ways. In particular, various thermal management scenarios may be derived depending on a vehicle interior condition, a vehicle external condition, conditions of the vehicle parts 110a and 110b, etc.

FIG. 1 shows main components related to the description of the fluid transfer device 100 applicable to the embodiments of the present disclosure, and the actual fluid transfer device 100 may be implemented by including more or fewer components than these components.

In addition, since the fluid transfer device 100 described in FIG. 1 represents an example of implementation applicable to the embodiments of the present disclosure, the fluid transfer device 100 according to the embodiments of the present disclosure is not necessarily limited to what has been described above.

Figure 2:
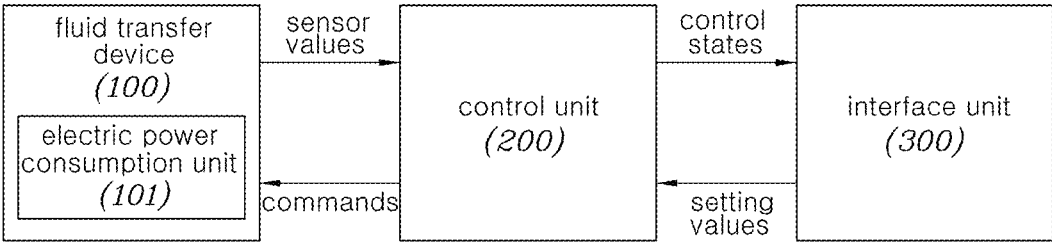
FIG. 2 is a diagram illustrating a vehicle thermal management system according to an embodiment of the present disclosure.

FIG. 2 is a view illustrating a configuration of the vehicle thermal management system according to the embodiments of the present disclosure.

Referring to FIG. 2, the vehicle thermal management system may include a fluid transfer device 100, a control unit 200, and an interface unit 300. However, FIG. 2 shows main components related to the description of the embodiments of the present disclosure, and thus, the actual thermal management system may be implemented by including more or fewer components than these components.

Here, the fluid transfer device 100 may be implemented as in the example described with reference to FIG. 1, and the control unit 200 may include: a memory configured to store algorithms for performing vehicle thermal management functions and data for software instructions for executing such algorithms; a processor configured to perform operations described below by using the data stored in the memory; a controller having the memory and the processor; and the like.

In this case, the control unit 200 may be implemented through one integrated controller, or may be implemented as a function of a specific controller provided in a vehicle. In addition, the control unit 200 may also be implemented through a combination of a plurality of controllers, and may also be implemented, for example, through a combination of a higher-level controller for performing determinations or calculations, which are required for the vehicle thermal management, and generating control commands and a lower-level controllers for receiving the control commands transmitted from the higher-level controller and controlling each of the components of the fluid transfer device 100.

The interface unit 300 may receive input of setting values, etc. from a vehicle user such as a driver, transmit the setting values to the control unit 200, and receive information such as control status from the control unit 200 to express the information in visual, auditory, and other manners. To this end, the interface unit 300 may be implemented with a vehicle cluster, an audio system, a video system, a navigation device, and a telematics (AVNT) device, etc., or may also be implemented with a terminal of the vehicle user such as the driver.

The control unit 200 according to the embodiments may perform optimal control for the vehicle thermal management, which will be described below with reference to FIG. 3.

Figure 3:
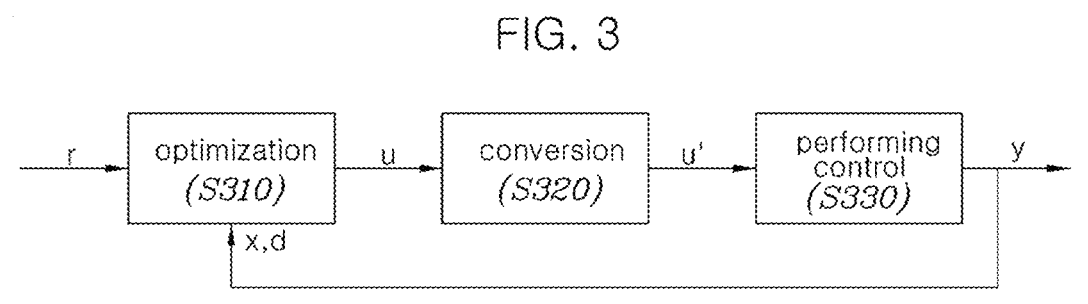

FIG. 3 is a view illustrating an optimal control process of a control unit according to an embodiment of the present disclosure.

Referring to FIG. 3, the control unit 200 may perform the vehicle thermal management through a process of optimization in step S310, conversion in step S320, and performing control in step S330.

The optimization in step S310 may be performed on a model basis. For example, Proportional-Integral-Differential (PID) control, Linear-quadratic regulator (LQR) control, etc. may be used for the optimization. In particular, the optimization in step S310 according to the embodiments of the present disclosure may be performed through Model-based Predictive Control (MPC).

More specifically, the process of optimization in step S310 through the model-based predictive control may be performed in a way that fundamentally reduces future errors in deriving an optimal control value u for allowing an output value y to follow a target value r.

To this end, the optimal control value u may be derived by using a control model for a predicted state value according to a current state value x. In other words, the optimal control value u may be derived by considering not only the current state but also the predicted future state.

In the control model for the predicted state value, at least one of the current control value u and a disturbance d may be further reflected in addition to the current state value x, and for example, the control model may be expressed as the equation below:

$$x_{k+1} = A_k x_k + B_k u_k + B_{w,k} + B_{\varphi,k}$$

In the above equation, $x_k$ and $x_{k+1}$ respectively mean a current state value and a predicted state value, and $w_k$ means a disturbance. $A_k$, $B_k$, and $B_{w,k}$ represent respective impacts of which the current state, control input, and disturbance cause on a future state, and $B_{\varphi,k}$ is a term for reflecting the uncertainty of prediction.

By utilizing the control model for such predicted state value, a predicted future state may be reflected in deriving an optimal control value.

Meanwhile, in the process of optimization in step S310, optimization for a target value r may also be performed prior to deriving the optimal control value u. In this case, the optimization for the target value r may be performed in a steady state, and the control model for an output value may be utilized hereto. Here, the control model for the output value represents an output value according to the current state value and current control value, and may be expressed in the equation below as an example.

$$\begin{bmatrix} A_k - I & B_k \\ C_k & 0 \end{bmatrix} \begin{bmatrix} x_{ss} \\ u_{ss} \end{bmatrix} \begin{bmatrix} -(B_{w,k}w_k + B_{\varphi,k}) \\ r \end{bmatrix}$$

Here, $x_{ss}$ and $u_{ss}$ respectively mean a state value and a control value in a steady state, and $w_k$ means a disturbance. $A_k$, $B_k$, and $B_{w,k}$ may represent respective impacts of which the current state, control input, and disturbance cause on a future state, $C_k$ may represent an impact of a state value on an output value, and r may represent a target value, i.e., the output value that is a target of control. $B_{\varphi,k}$ is a term for reflecting the uncertainty of prediction.

In contrast, in the embodiments, the process of optimization for the target value r in the steady state may also be omitted. In this case, the optimization may be performed so as to cause the output value to follow the target value in a dynamic state where the state value changes.

Meanwhile, in the process of optimization in step S310 through the model-based predictive control, the optimal control value u may be derived through a cost function for a preset prediction range.

Here, the preset prediction range means how far into the future the prediction is to be performed and may also be expressed as a prediction horizon. As the prediction range increases, optimization performance may improve. However, as the prediction range increases, the computational load of the control unit 200 for the prediction may increase.

In the embodiments, the optimal control value may be determined as a control value for minimizing a cost function for the preset prediction range described above. In this case, the cost function may reflect a state cost having a weight on a state value and a control input cost having a weight on a control value. Furthermore, a final state cost having a weight on a final state value of a prediction range and a control variation cost having a weight on a variation in the control value may be further considered. For example, such a cost function may be expressed as the equation below.

$$J(U_k) = x_N^T Q_f x_N + \sum_{i=0}^{N-1} \left( \|x_{k+i} - x_{ss,k}\|_Q^2 + \|u_{k+i} - u_{ss,k}\|_R^2 + \|\Delta u_{k+i}\|_{R_{du}}^2 \right)$$

Here, $J(U_k)$ is a cost function, and an optimal control value may be determined as a control value corresponding to a current time point among control values $U_k$ for minimizing $J(U_k)$.

$x_{k+i}$ and $x_{ss,k}$ respectively correspond to a predicted state value for a prediction range and a target state value for outputting a target value r. In a control process through the optimal control value u, the term $x_{k+i}$ changes in a direction of following $x_{ss,k}$. Here, $$\|x_{k+i} - x_{ss,k}\|_Q^2$$

is a term for reflecting a cost of a state value and is related to a speed at which the predicted state value reaches the target state value. The larger a weight Q, the faster the speed at which the predicted state value reaches the target state value. In other words, as the weight Q has a larger value, performance of following a control target improves and the control target may be achieved quickly.

$u_{k+i}$ and $u_{ss,k}$ respectively correspond to a predicted control value for a prediction range and a target control value for outputting a target value r. In a process of controlling through the optimal control value u, $u_{k+i}$ changes in a direction of following $u_{ss,k}$. Here, $$\|u_{k+i} - u_{ss,k}\|_R^2$$

is a term for reflecting a cost for a control value and is related to a speed at which the predicted control value reaches the target control value. The larger a weight R, the more energy consumption may be reduced in a process where the predicted state value reaches the target state value. In other words, as the weight R has a larger value, the energy performance of control improves and the control target may be achieved with less energy.

Meanwhile, $x_N$ means a final state value of the preset prediction range, and $Q_f$ represents a weight on the final state value. Here, $$x_N^T Q_f x_N$$

is a term for reflecting a cost for a final state and is applicable to guarantee the stability of prediction through a finite prediction range.

$$\|\Delta u_{k+i}\|_{R_{du}}^2$$

is a term for reflecting a cost for a variation of a control value, and $R_{du}$ represents a weight on the variation of the control value. The cost for the variation of the control value may be applied to limit excessive change in the control value in a process of following a target value.

Meanwhile, unlike that the target value r may be optimized in the steady state, the control value may be optimized in a dynamic state where the state value x changes. In other words, an optimal control value u may be derived from the dynamic state.

In one embodiment, the control value may be optimized in the dynamic state where the state value x changes. In other words, the optimal control value u may be derived from the dynamic state. In this case, both the target value r and the optimal control value u may also be optimized in the dynamic state (i.e., stage 1), the target value r is optimized in the steady state, and the optimal control value u may also be optimized in the dynamic state (i.e., stage 2).

The optimal control value u derived as above may be a physical quantity, such as a mass flow rate of refrigerant or coolant, an air mass flow rate, or the like, for causing an impact on the vehicle thermal management according to the operation of each component of the fluid transfer device 100. In this case, the control unit 200 may convert the optimal control value u derived with the physical quantity through a process of conversion in step S320 to an operational quantity u', such as rotational speed and duty for controlling the operation of each component of the fluid transfer device 100. However, the optimal control value u is not necessarily limited to the above form, and may have various forms depending on each component of the fluid transfer device 100. In this case, when conversion to an operational quantity is not required, the process of conversion in step S320 may also be omitted.

After the above optimization in step S310 and conversion in step S320 are performed, actual control for each component of the fluid transfer device 100 is performed according to the optimal control value u and the corresponding operational quantity u', and the results of the control execution may appear in a form of an output value y. In this case, the output value y may be collected through each of various sensors provided in a vehicle, converted into a physical quantity when required, and then transmitted back to the control unit 200. In this case, the control unit 200 may determine a current state x and a disturbance d according to the output value y, and these may be reflected again in the optimization in step S310.

Referring back to FIG. 2, the vehicle thermal management system according to the embodiments of the present disclosure performs the vehicle thermal management on the basis of an optimal control value for satisfying a constraint of a waste heat recovery amount according to thermal management results of the vehicle parts 110 and generating a target discharge air temperature for performing, by the fluid transfer device 100, indoor heating while consuming minimal electric power through the electric power consumption unit 101, thereby proposing improvement of the energy efficiency of the vehicle thermal management therethrough.

To this end, according to the embodiments of the present disclosure, the vehicle thermal management system may include: a fluid transfer device 100 provided with a heat pump function for exchanging heat with at least one or more vehicle parts 110 to selectively recover waste heat of the vehicle parts 110 and discharging air into a vehicle interior to perform indoor heating and configured to include an electric power consumption unit 101 for consuming electric power in order to perform the heat pump function. The vehicle thermal management system may include a control unit configured to control the indoor heating through the fluid transfer device 100 on the basis of an optimal control value for heating derived by using a control model for a predicted state value according to a current state value.

In this case, the optimal control value for the indoor heating is a control value for satisfying a constraint of a waste heat recovery amount according to thermal management results of the vehicle parts 110 and generating a target discharge air temperature for performing, by the fluid transfer device 100, indoor heating while consuming minimal electric power through the electric power consumption unit.

The fluid transfer device 100 may be implemented, for example, as in the example described with reference to FIG. 1, and the electric power consumption unit 101 may include the above-described components, which operate through electric power consumption, such as the pumps 121 and 122, the compressor 151, the cooling fan 171, and the heater 161.

The control unit 200 may derive the optimal control value for the indoor heating on the basis of a target value for performing, by the fluid transfer device 100, the indoor heating while consuming the minimal electric power through the electric power consumption unit 101. Here, the target value may be determined on the basis of electric power consumption and a control model for an output value according to the state value and control value. The control model described above with reference to FIG. 2 may be applied to the control model for the output value according to the state value and control value. Here, the state value may mean not only the current state value but also the predicted state value. That is, not only the current state value but also the predicted state value can be input to the control model. The electric power consumption according to the state value and control value may be applied in a form of a cost function for causing the electric power consumption according to the state value and control value to be minimized, and may be applied in a form of the equation below as an example.

$$[x_{ss}\,u_{ss}]^{T} = \min_{x_{ss}u_{ss}} \sum P_{j}$$

Here, $x_{ss}$ and $u_{ss}$ are respectively a state value and a control value, which are for reaching a control target and may be derived through steady-state optimization as described above. $P_{j}$ means electric power consumption determined according to the state value and control value.

In the embodiments, the electric power consumption unit 101 may include: coolant pumps 121 and 122 for flowing a coolant for cooling vehicle parts; and a compressor 151 for compressing and discharging a refrigerant for recovering waste heat from the vehicle parts through the coolant. In this case, an optimal control value may include: a mass flow rate of the coolant passing through the coolant pumps 121 and 122; and a mass flow rate of the refrigerant passing through the compressor 151.

Furthermore, the electric power consumption unit 101 may include a heater 161 for heating air being discharged into a vehicle interior. In this case, an optimal control value may further include electric power consumption of the heater 161.

The fluid transfer device 100 may selectively absorb heat from air outside a vehicle according to recovery results of the waste heat of the vehicle parts 110, and to this end, the electric power consumption unit 101 may include a fan 171 for flowing the air outside the vehicle into the fluid transfer device. In this case, an optimal control value may include a mass flow rate of the outside air flowing into the fluid transfer device 100.

A current state value and a predicted state value may include the temperature of air being discharged into a vehicle interior and the temperature of a refrigerant for circulating within the fluid transfer device 100 and recovering waste heat from the vehicle parts 110. The temperature of the refrigerant may be divided into a condenser 152 side temperature, an evaporator 156 side temperature, etc. Furthermore, the current state value and the predicted state value may further include a state value for the temperature of each of the vehicle parts 110. The status value for the temperature of each of the vehicle parts 110 may include, for example, a motor coil temperature, a motor oil temperature, a battery cell temperature, or the like.

In the embodiments, the control unit 200 derives an optimal control value by reflecting a constraint on a waste heat recovery amount, and the constraint on the waste heat recovery amount of the vehicle parts 110 may be determined according to thermal management results of the vehicle parts 110.

More specifically, the constraint on the waste heat recovery amount may be determined on the basis of a recoverable amount reflecting a heat dissipation amount of the vehicle parts 110 and heat transfer efficiency in a process of heat exchange between the fluid transfer device 100 and the vehicle parts 110.

For example, the constraint on the waste heat recovery amount may include: a condition satisfied in a case where a recoverable amount is less than or equal to an optimal heat dissipation amount discharged through the thermal management of the vehicle parts 110; and a condition satisfied in a case where a recoverable amount is greater than a minimum heat dissipation amount of the vehicle parts 110. Furthermore, in a case where both of the above two conditions are applied, the constraint on the waste heat recovery amount may be satisfied in a case where the recoverable amount is within a range between the minimum heat dissipation amount and optimal heat dissipation amount of the vehicle parts 110.

Here, the recoverable amount may be determined on the basis of i) a difference between the temperature of the refrigerant in the refrigerant line RL and the temperature of the coolant flowing out from the vehicle parts 110, and ii) a mass flow rate of the coolant passing through the vehicle parts 110. In particular, the heat transfer efficiency until the waste heat of the vehicle parts 110 is transferred from the coolant to the refrigerant may also be reflected hereto.

The minimum heat dissipation amount may be calculated differently depending on the vehicle parts 110, and a plurality of state values for temperatures of any one of the vehicle parts 110 may be considered in combination.

For example, a minimum heat dissipation amount of the drive system 110a may be calculated through the equation below.

$$\dot{Q}_{min} = \max\left(0, \min\left(\begin{array}{c} \frac{mc_{coil}(T_{coil} - T_{coil,min})}{T_{s,coil}} \\ \frac{mc_{coil}(T_{coil,max} - T_{coil})}{T_{s,coil}} \\ \frac{mc_{sw}(T_{sw} - T_{sw,min})}{T_{s,inv}} \\ \frac{mc_{sw}(T_{sw,max} - T_{sw})}{T_{s,inv}} \end{array}\right)\right)$$

Here, $\dot{Q}_{min}$ is a minimum heat dissipation amount. $mc_{coil}$ and $mc_{sw}$ respectively represent heat capacity of a motor coil and heat capacity of an element of an inverter. $T_{coil}$ and $T_{sw}$ represent respective current temperatures of the motor coil and the element of the inverter. $T_{coil,min}$, $T_{coil,max}$, $T_{sw,min}$, and $T_{sw,max}$ may respectively represent a minimum temperature of the coil, a maximum temperature of the coil, a minimum temperature of the element, and a maximum temperature of the element. $T_{s,coil}$ and $T_{s,inv}$ are values that are variable depending on settings.

For example, a minimum heat dissipation amount of the battery 110b may be calculated through the equation below.

$$\dot{Q}_{min} = \max\left(0, \min\left(\begin{array}{c} \frac{mc_{bat}(T_{cell} - T_{cell,min})}{T_{s,cell}} \\ \frac{mc_{bat}(T_{cell,max} - T_{cell})}{T_{s,cell}} \end{array}\right)\right)$$

Here, $\dot{Q}_{min}$ is a minimum heat dissipation amount. $mc_{bat}$ represents a heat capacity of a battery. $T_{cell}$ represent respective current temperatures of a cell of the battery. $T_{cell,min}$, $T_{cell,max}$ may respectively represent a minimum temperature of the cell, a maximum temperature of the cell. $T_{s,cell}$ is a value that is variable depending on settings.

However, unlike the example above, the minimum heat dissipation amount may also simply be set to "0".

An optimal heat dissipation amount may be determined on the basis of a difference between a current temperature and a target temperature of each of the vehicle parts 110, and may mean a heat dissipation amount required for cooling the current temperature to the target temperature of each of the vehicle parts 110.

As described above, for the thermal management of the vehicle parts 110, a control margin may also be applied to comparison of a minimum heat dissipation amount, an optimal heat dissipation amount, and a recoverable amount when a constraint on a waste heat recovery amount is determined.

As described above, an optimal control value for indoor heating is derived by reflecting the constraint on the waste heat recovery amount according to the thermal management results of the vehicle parts 110, so that additional electric power may not be consumed unnecessarily in order to generate heat for the indoor heating, whereby the energy efficiency of the vehicle thermal management may be improved.

Meanwhile, in addition to performing the model-based optimal control as described above, the control unit 200 may also perform thermal management through rule-based control.

For example, in a case where the fluid transfer device 100 includes an opening/closing device 174 for controlling an air flow inside the fluid transfer device according to an opening amount, the control unit 200 may control the opening amount of the opening/closing device on the basis of temperature of air being discharged to a vehicle interior. More specifically, the opening/closing device 174 may be a temp door for controlling a degree at which cooled air on an evaporator 156 side flows into the vehicle interior. In this case, the control unit 200 may increases the opening amount of the temp door so as to increase the degree at which the cooled air from the evaporator 156 side flows into the vehicle interior even when the temperature reaches a target temperature and there is still heat remaining through waste heat recovery, etc.

Meanwhile, the control unit 200 according to the embodiments of the present disclosure may perform the thermal management for the vehicle parts 110 in addition to the indoor heating, and in this case, the thermal management for the vehicle parts 110 may be performed on the basis of an optimal control value for the vehicle part thermal management for maximizing a heat dissipation amount of the vehicle parts through heat exchange between the fluid transfer device and the vehicle parts in comparison with the electric power consumption of the electric power consumption unit 101 while satisfying the constraint for securing the operational performance of the vehicle parts.

More specifically, the control unit 200 may utilize the control model for the predicted state value in deriving the optimal control value for the vehicle part thermal management. For example, the control model for the predicted state value may be applied with the control model for the predicted state value as described with reference to FIG. 2.

In addition, the control unit 200 may derive an optimal control value on the basis of a target value for maximizing a heat dissipation amount of the vehicle parts 110 in comparison with the electric power consumption of the electric power consumption unit 101. Here, a target value may be determined on the basis of electric power consumption, a heat dissipation amount, and a control model for an output value according to a state value and a control value. The control model described above with reference to FIG. 2 may be applied to the control model for the output value according to the state value and control value, and the electric power consumption and the heat dissipation amount according to the state value and control value may be applied in the form of a cost function for minimizing the electric power consumption according to the state value and control value and maximizing the heat dissipation amount according to the state value and control value. For example, the control model may be applied in a form of the equation below.

$$J_{ss} = P_j - Q_j$$

Here, $P_j$ may mean electric power consumption determined according to a state value and control value, and $Q_j$ may mean a heat dissipation amount determined according to the state value and control value.

As described above, the control unit 200 may determine the control value for minimizing the cost function for the preset prediction range as the optimal control value for the vehicle part thermal management by using the optimized target value and the control model for the prediction state. In this case, the cost function described above with reference to FIG. 2 may be applied as this cost function.

Meanwhile, optimal control values for the vehicle part thermal management may include various control values involved in the thermal management of the vehicle parts 110, and may particularly include temperatures and mass flow rates, which are obtained at inlet sides of the vehicle parts 110, of a coolant circulating within the fluid transfer device 100 and exchanging heat with the vehicle parts 110.

In addition, current state values and predicted state values may also represent various states depending on the vehicle parts 110.

For example, in a case of the drive system 110a included in the vehicle parts 110, a current state value and a predicted state value may include a drive system outlet-side temperature of the coolant circulating within the fluid transfer device 100. In addition, the current state value and predicted state value may further include at least one of a motor oil temperature, a motor coil temperature, and the temperature of an element driving an inverter.

In addition, in a case of the battery 110b included in the vehicle parts 110, a current state value and a predicted state value may include a cell temperature of the battery 110b and a battery outlet-side temperature of the coolant circulating within the fluid transfer device 100.

Meanwhile, in performing the thermal management for the vehicle parts 110, an optimal control value for the vehicle part thermal management may be derived by reflecting a constraint for securing the operational performance of the vehicle parts 110.

For example, in a case of the drive system 110a included in the vehicle parts 110, a constraint for securing the operational performance of the vehicle parts 110 may include at least one of: a first condition for the operational performance of the drive system and of which the satisfaction is determined on the basis of a motor oil temperature; a second condition for the operational performance of the drive system and of which the satisfaction is determined on the basis of a motor coil temperature; and a third condition for the operational performance of the drive system of which the satisfaction is determined on the basis of the temperature of an element driving an inverter.

In addition, in a case of the battery 110b included in the vehicle parts 110, a constraint for securing the operational performance of the vehicle parts 110 may include a condition for operational performance of the battery 110b and of which the satisfaction is determined on the basis of a cell temperature of the battery 110b.

However, the constraint for securing the operational performance of the vehicle parts 110 is not necessarily limited to the above examples, and various constraints may be applied thereto depending on components of the vehicle parts 110.

For example, in a case where the vehicle parts 110 include a controller such as an autonomous driving controller, a constraint for securing the operational performance of the vehicle parts 110 may include a condition for operational performance of the controller and of which the satisfaction is determined on the basis of temperature of the controller.

When the optimal control values for the vehicle part thermal management as described above are derived, the control unit 200 performs the thermal management of the vehicle parts 110 by controlling the fluid transfer device 100 on the basis of the optimal control values for the vehicle part thermal management.

In addition, the control unit 200 may control heat transfer paths between the fluid transfer device 100 and the vehicle parts 110 on the basis of temperatures of the vehicle parts 110, thereby also performing the vehicle part thermal management therewith. In this case, for example, as described with reference to FIG. 1, the heat transfer paths may be controlled by way of controlling the circulation of coolant in the coolant lines CL1 and CL2. To this end, the control unit 200 may control operations of the valves 141 and 142, the pumps 121 and 122, etc.

In another embodiment of the present disclosure, thermal management of vehicle parts 110 may also be performed in another manner. That is, the thermal management of the vehicle parts 110 may also be performed through rule-based control and the like, which control a fluid transfer device on the basis of preset control rules, in addition to the optimization through the model-based predictive control (MPC).

In addition, according to a yet another embodiment of the present disclosure, a control unit 200 may derive each of an optimal control value for indoor heating and an optimal control value for vehicle part thermal management, and may also perform the indoor heating of a vehicle and the thermal management of the vehicle parts 110 on the basis of the respective optimal control values.

In this case, when there is an overlap between the derived optimal control value for the indoor heating and the derived optimal control value for the vehicle part thermal management, the control unit 200 may perform the indoor heating and the thermal management of the vehicle parts 110 by using either the optimal control value for the indoor heating or the optimal control value for the vehicle part thermal management.

More specifically, in a case where a control value for controlling a component included in the fluid transfer device is included in both an optimal control value for heating and an optimal control value for the vehicle part thermal management, the control unit 200 may control the corresponding component of the fluid transfer device on the basis of a maximum or minimum value among the optimal control value for the indoor heating and the optimal control value for the vehicle parts.

For example, in a case where an optimal control value for the indoor heating and the optimal control value for the vehicle part thermal management respectively have control values for the pumps 121 and 122, the pumps 121 and 122 may be controlled on the basis of a maximum or minimum value among the control values, which are for the pumps 121 and 122 and included in the optimal control value for the indoor heating and the optimal control value for the vehicle part thermal management. In this case, whether to use the maximum value or the minimum value for control may be applied differently for each of the vehicle parts 110.

Hereinafter, a process of the vehicle thermal management described so far will be described with reference to a flowchart.

Figure 4:
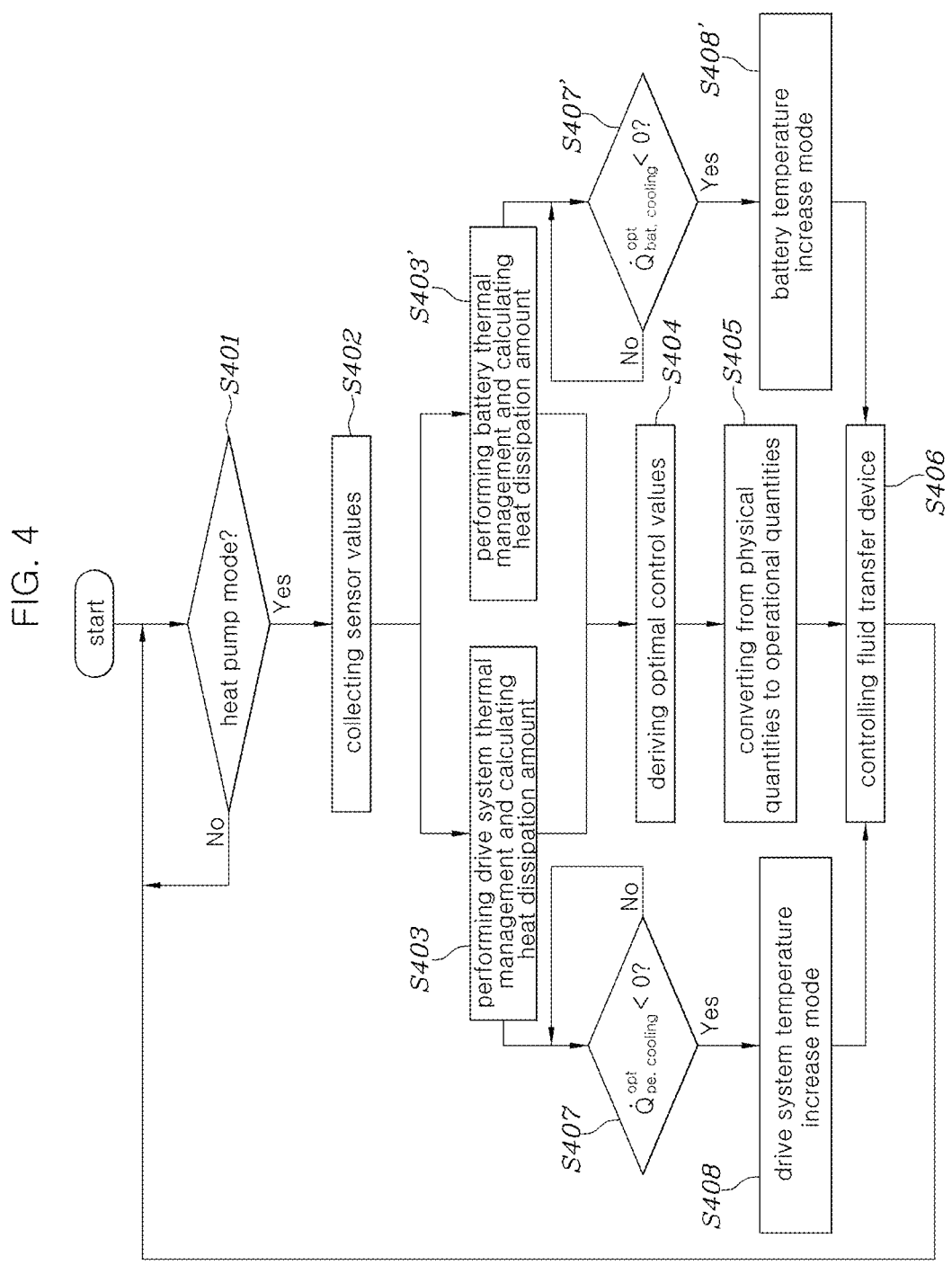
FIG. 4 is a flowchart illustrating a process of performing vehicle thermal management according to an embodiment of the present disclosure.

FIG. 4 is a flowchart illustrating a process of performing vehicle thermal management according to an exemplary embodiment of the present disclosure.

Referring to FIG. 4, in step S402, a control unit 200 may collect sensor values for components of a fluid transfer device 100, which is a control target, in a case where a heat pump mode is being performed (i.e., Yes in step S401), that is, in a case where a refrigerant is circulating on a refrigerant line NL for thermal management of a vehicle interior. In this case, the collected sensor values may be operational quantities of respective components, and may be converted into physical quantities when required to derive respective optimal control values.

In steps S403 and S403', the control unit 200 may perform the thermal management on vehicle parts 110 before performing indoor thermal management on the basis of an optimal control value for heating.

In a case of a drive system 110*a* included in the vehicle parts 110, thermal management of the drive system 110*a* may be performed, and in this case, methods of performing the thermal management are not limited thereto. In addition, in step S403, the control unit 200 calculates a heat dissipation amount according to the thermal management of the drive system 110*a* in order to derive the optimal control value for the indoor heating for the indoor thermal management.

In a case of a battery 110*b* included in the vehicle parts 110, thermal management of the battery 110*b* may be performed, and similarly, methods of performing the thermal management are not limited thereto. In addition, in step S403', the control unit 200 calculates a heat dissipation amount according to the thermal management of the battery 110*b* in order to derive the optimal control value for the indoor heating for the indoor thermal management.

The thermal management of the drive system 110*a* in step S403 and the thermal management of the battery 110*b* in step S403' may also be performed simultaneously, and heat dissipation amounts calculated herein may include a minimum heat dissipation amount and an optimal heat dissipation amount, which are described above with reference to FIG. 3.

In step S404, the control unit 200 derives the optimal control value for the indoor heating on the basis of the calculated heat dissipation amounts of the vehicle parts 110. In this case, the optimal control value for the indoor heating may be reflected with a constraint on a waste heat recovery amount according to thermal management results of the vehicle parts 110.

Thereafter, in step S405, the control unit 200 may convert the optimal control value for the indoor heating derived as a physical quantity into an operational quantity, and control the fluid transfer device 100 on the basis thereof, thereby performing the indoor heating.

Meanwhile, in a case where the calculated optimal heat dissipation amount according to the thermal management of the vehicle parts 110 has a value less than zero in steps S407 and S407', the control unit 200 may enter control for increasing temperature of the vehicle parts 110.

The fact that the optimal heat dissipation amount is less than zero means that the waste heat of the vehicle parts 110 is unable to be recovered, and further means that the vehicle parts 110 are required to absorb heat, so the control unit 200 may perform the thermal management of the vehicle parts 110 by increasing the temperature of the vehicle parts 110.

For example, in a case where the optimal heat dissipation amount according to the thermal management of the drive system 110*a* is less than zero (i.e., Yes in step S407), the control unit 200 may enter a drive system temperature increase mode in step S408. Through controlling of the fluid transfer device 100, such as controlling a valve 141 of a coolant line CL1 and stopping operation of a pump 121, the control unit 200 may prevent heat generated in the drive system 110*a* to be radiated to the outside of the vehicle or transferred to a refrigerant line RL through a heat absorber 159, but may allow the heat to be transferred back to the drive system 110*a*, thereby increasing the temperature of the drive system 110*a* in step S408.

In addition, in a case where the optimal heat dissipation amount according to the thermal management of the battery 110*b* is less than zero (i.e., Yes in step S407'), the control unit 200 may enter a battery temperature increase mode, and increase the temperature of the battery 110*b* in step S408' by controlling the fluid transfer device 100, such as controlling a valve 142 of a coolant line CL2 and operating a coolant heater 162.

Another embodiment of the present disclosure is described below with reference to FIG. 5.

Figure 5:
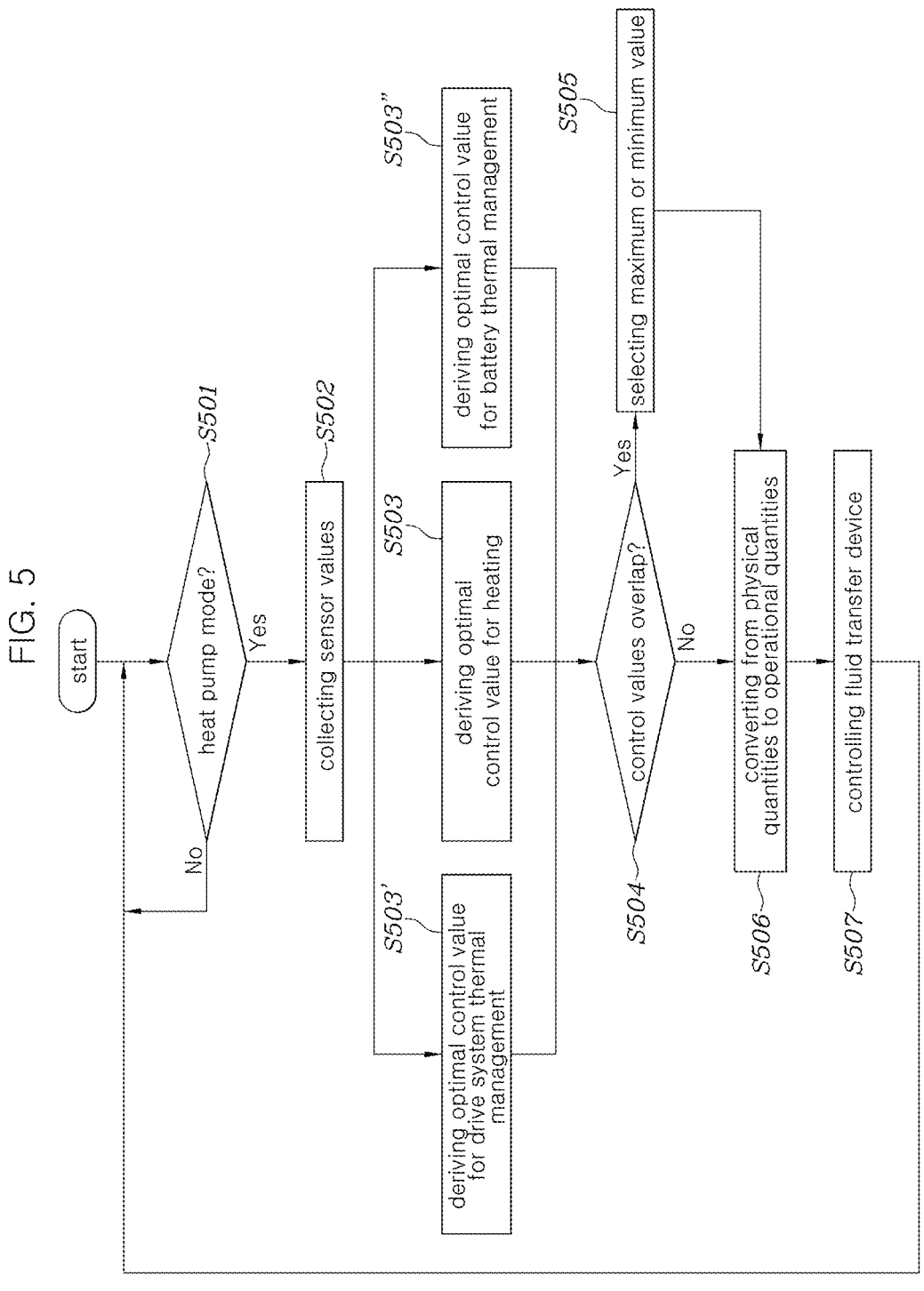
FIG. 5 is a flowchart illustrating a process of performing vehicle thermal management according to another embodiment of the present disclosure.

FIG. 5 is a flowchart illustrating a process of performing vehicle thermal management according to another embodiment of the present disclosure.

Referring to FIG. 5, a process before deriving optimal control values in steps S501 and S502 may be performed in the same manner as the previous embodiment.

However, in another embodiment of the present disclosure, instead of performing thermal management on vehicle parts 110 and then deriving an optimal control value for heating by reflecting results thereof, a process in step S503 of deriving the optimal control value for the indoor heating thermal management and a process in steps S503' and S503" of deriving an optimal control value for vehicle part thermal management may be performed separately.

For example, step S503 of deriving an optimal control value for heating, step S503' of deriving an optimal control value for drive system thermal management, and step S503" of deriving an optimal control value for battery thermal management may be performed simultaneously, in which case control values for controlling one target may be derived redundantly.

In a case where control values for controlling one target do overlap (i.e., Yes in step S504), the control unit 200 may select a control value having the largest value or the smallest value among the derived optimal control values, and perform a process of converting the selected control value in step S506, thereby controlling the fluid transfer device 100 in step S507.

In a case where the control values for controlling one target do not overlap (i.e., No in step S504), the control unit 200 may convert each derived optimal control value in step S506 without requiring selection of a control value, and then control the different components of the fluid transfer device 100 in step S507.

According to various embodiments of the present disclosure as described above, the indoor heating is controlled in consideration of the constraint on the waste heat recovery amount according to the vehicle part thermal management results, so as to consume energy efficiently and achieve a goal of the indoor heating, thereby enabling to increase a driving distance compared to electric vehicle power efficiency and a charging amount of a vehicle therethrough.

As described above, although some embodiments of the present disclosure have been described for illustrative purposes, those having ordinary skill in the art should appreciate that various modifications, additions, and substitutions are possible, without departing from the technical scope and idea of the present disclosure as disclosed in the accompanying claims.

What is claimed is:

1. A vehicle thermal management system comprising:
a fluid transfer device provided with a heat pump function for exchanging heat with at least one or more vehicle parts to selectively recover waste heat of the at least one or more vehicle parts and discharging air into a vehicle interior to perform indoor heating, wherein the fluid transfer device includes an electric power consumption unit configured to consume electric power to perform the heat pump function; and
a control unit configured to control the indoor heating through the fluid transfer device based on an optimal control value for indoor heating, wherein the optimal control value is derived by using a control model for a predicted state value according to a current state value, wherein the optimal control value for the indoor heating is a control value for satisfying a constraint of a waste heat recovery amount according to thermal management results of the at least one or more vehicle parts and generating a target discharge air temperature for performing, by the fluid transfer device, indoor heating while consuming minimal electric power through the electric power consumption unit.

2. The vehicle thermal management system of claim 1, wherein the electric power consumption unit comprises:
coolant pumps configured to flow a coolant for cooling the vehicle parts; and
a compressor configured to compress and discharge a refrigerant that recovers the waste heat from the vehicle parts through the coolant, and
wherein the optimal control value for the indoor heating comprises:
a mass flow rate of the coolant passing through the coolant pumps; and
a mass flow rate of the refrigerant passing through the compressor.

3. The vehicle thermal management system of claim 2, wherein the electric power consumption unit further comprises a heater configured to heat the air being discharged into the vehicle interior, and
the optimal control value for the indoor heating further comprises electric power consumption of the heater.

4. The vehicle thermal management system of claim 2, wherein:
the fluid transfer device is configured to selectively absorb heat from air outside the vehicle according to the thermal management results of the at least one or more vehicle parts,
the electric power consumption unit further comprises a fan configured to flow the air outside the vehicle towards the vehicle interior, and
the optimal control value further comprises a mass flow rate of the outside air flowing in.

5. The vehicle thermal management system of claim 1, wherein the current state value and the predicted state value comprises:

a temperature of the air being discharged into the vehicle interior; and
a temperature of a refrigerant for recovering the waste heat from the at least one or more vehicle parts.

6. The vehicle thermal management system of claim 1, wherein the constraint on the waste heat recovery amount is determined based on a recoverable amount of the fluid transfer device, the recoverable amount reflecting a heat dissipation amount of the at least one or more vehicle parts and heat transfer efficiency in a heat exchange process between the fluid transfer device and the at least one or more vehicle parts.

7. The vehicle thermal management system of claim 1, wherein the control unit is configured to derive the optimal control value for the indoor heating based on a target value for performing, by the fluid transfer device, the indoor heating while consuming the minimal electric power through the electric power consumption unit, and
the target value is determined based on electric power consumption and a control model for an output value according to the state value and control value.

8. The vehicle thermal management system of claim 7, wherein the control unit is configured to determine a control value for minimizing a cost function for a preset prediction range as the optimal control value for the indoor heating, and
the cost function reflects a state cost having a weight on the state value and a control input cost having a weight on the control value.

9. The vehicle thermal management system of claim 1, wherein the control unit is configured to control vehicle part thermal management through the fluid transfer device based on an optimal control value for the vehicle part thermal management, which is derived by using the control model for the predicted state value according to the current state value, and
the optimal control value for the vehicle part thermal management is a control value for maximizing a heat dissipation amount of the vehicle parts by exchanging heat between the fluid transfer device and the at least one or more vehicle parts in comparison with the electric power consumption of the electric power consumption unit while satisfying a constraint for securing operational performance of the at least one or more vehicle parts.

10. The vehicle thermal management system of claim 9, wherein the control unit is configured to derive the optimal control value for the vehicle part thermal management based on a target value for maximizing the heat dissipation amount of the vehicle parts in comparison with the electric power consumption of the electric power consumption unit, and
the target value is determined based on the electric power consumption and the heat dissipation amount according to the state value and the control value, and a control model for an output value.

11. The vehicle thermal management system of claim 9, wherein the control unit is configured to determine a control value for minimizing a cost function for a preset prediction range as the optimal control value for the vehicle part thermal management, and
the cost function reflects a state cost having a weight on the state value and a control input cost having a weight on the control value.

12. The vehicle thermal management system of claim 9, wherein the optimal control value for the vehicle part thermal management comprises a vehicle part inlet-side temperature and a mass flow rate of a coolant circulating within the fluid transfer device and exchanging the heat with the at least one or more vehicle parts.

13. The vehicle thermal management system of claim 9, wherein the at least one or more vehicle parts comprise a battery provided in the vehicle to store the electric power, and the current state value and the predicted state value comprise a cell temperature of the battery and a battery outlet-side temperature of a coolant circulating within the fluid transfer device.

14. The vehicle thermal management system of claim 13, wherein the constraint for securing the operational performance of the vehicle parts comprises a condition for battery operational performance, and wherein whether the condition for battery operational performance is satisfied is determined based on the cell temperature of the battery.

15. The vehicle thermal management system of claim 9, wherein the at least one or more vehicle parts comprises a drive system comprising a motor and an inverter, and the current state value and predicted state value comprise:

a drive system outlet-side temperature of a coolant circulating within the fluid transfer device, and at least one of a motor oil temperature, a motor coil temperature, or a temperature of an element driving the inverter.

16. The vehicle thermal management system of claim 15, wherein the constraint for securing the operational performance of the at least one or more vehicle parts comprise at least one of:

a first condition, which is determined based on the motor oil temperature, for a drive system operational performance;

a second condition, which is determined based on the motor coil temperature, for the drive system operational performance; or a third condition, which is determined based on the temperature of the element driving the inverter, for the drive system operational performance.

17. The vehicle thermal management system of claim 9, wherein the at least one or more vehicle parts comprise a controller provided in the vehicle to perform control for performing a specific function, and the current state value and predicted state value comprise a temperature of the controller and a controller outlet-side temperature of a coolant circulating within the fluid transfer device.

18. The vehicle thermal management system of claim 17, wherein the constraint for securing the operational performance of the at least one or more vehicle parts comprise a condition for controller operational performance, and wherein whether the condition for the controller operational performance is satisfied is determined based on the temperature of the controller.

19. The vehicle thermal management system of claim 1, wherein the control unit is configured to control vehicle part thermal management through the fluid transfer device based on preset control rules.

20. A vehicle thermal management system comprising:

a fluid transfer device provided with a heat pump function for exchanging heat with at least one or more vehicle parts to selectively recover waste heat of the at least one or more vehicle parts and discharging air into a vehicle interior to perform indoor heating, wherein the fluid transfer device includes an electric power consumption unit configured to consume electric power in order to perform the heat pump function; and a control unit configured to control the indoor heating through the fluid transfer device based on an optimal control value for indoor heating derived by using a control model for a predicted state value according to a current state value, and configured to control vehicle thermal management through the fluid transfer device based on an optimal control value for vehicle part thermal management, which is derived by using the control model for the predicted state value according to the current state value, wherein when a control value for controlling a certain component included in the fluid transfer device is included in both the optimal control value for the indoor heating and the optimal control value for the vehicle part thermal management, the control unit is configured to control the corresponding component of the fluid transfer device based on a maximum or minimum value of the optimal control value for the indoor heating and the optimal control value for the vehicle part thermal management.

* * * * *